April 7, 1970  J. McBREEN  3,505,115
ALKALINE BATTERY
Filed May 11, 1967  4 Sheets-Sheet 1
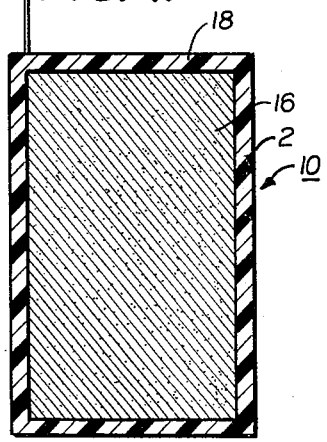
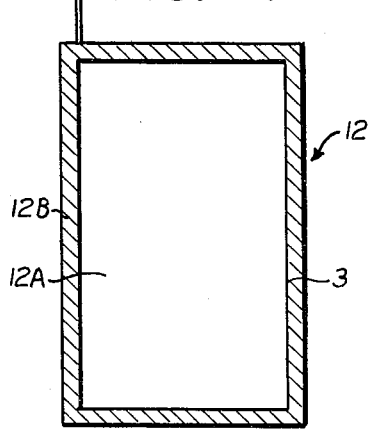
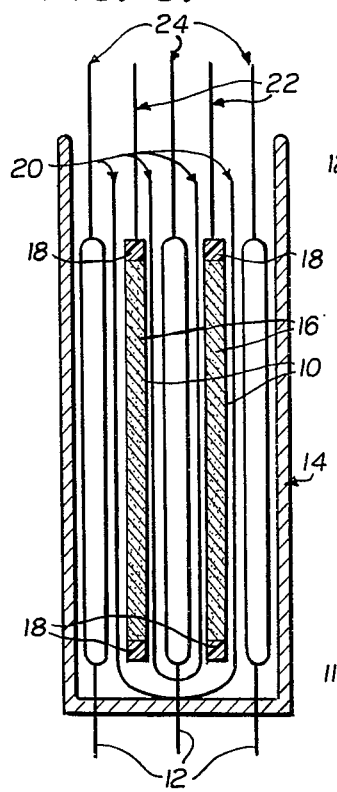
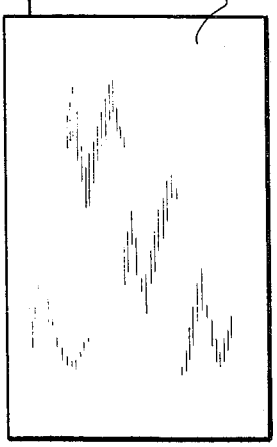
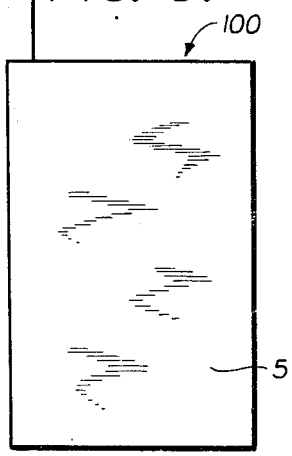
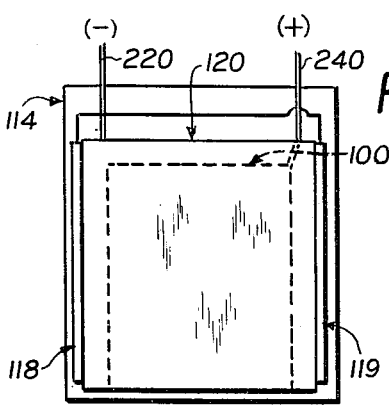
INVENTOR
JAMES McBREEN
ATTORNEY.

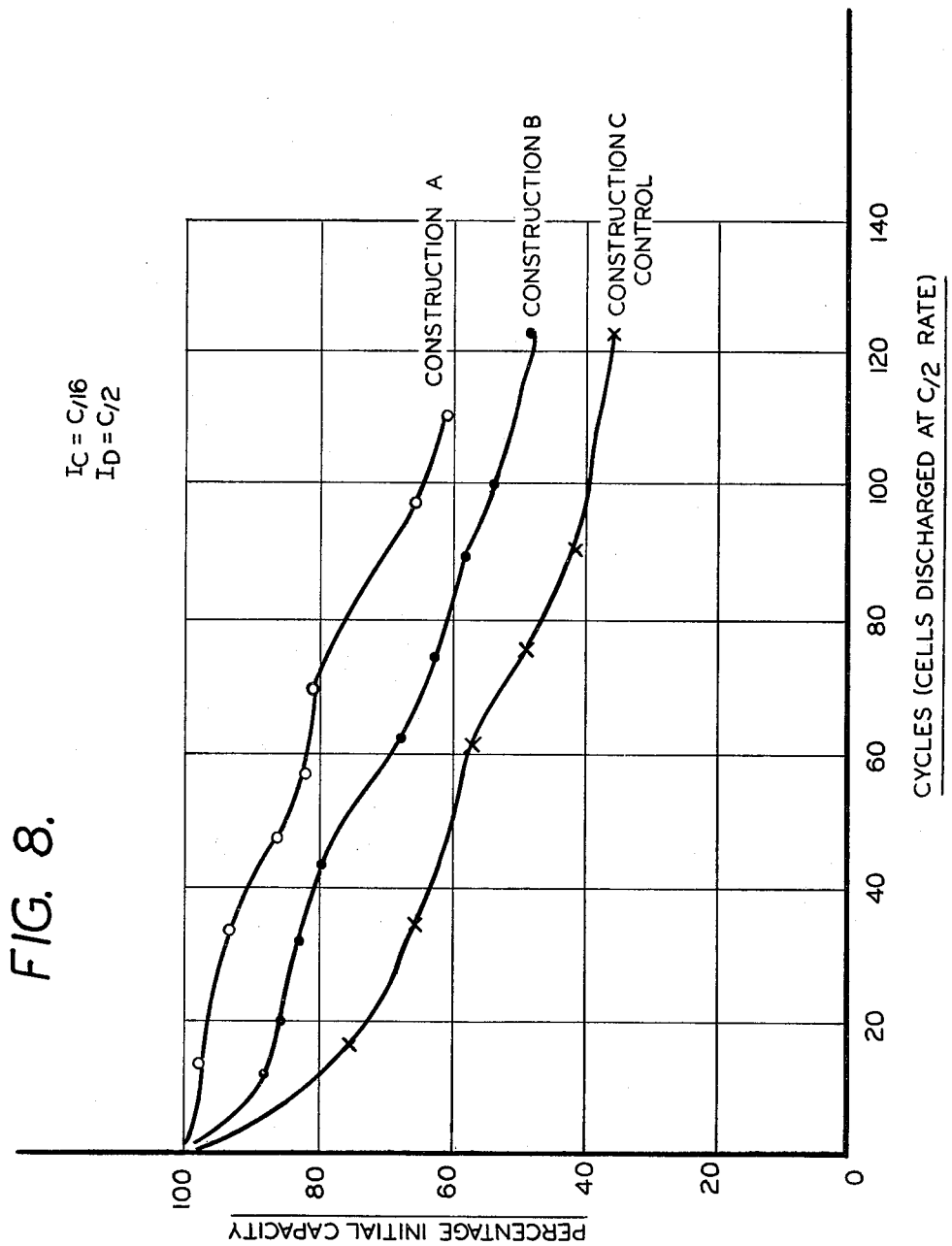

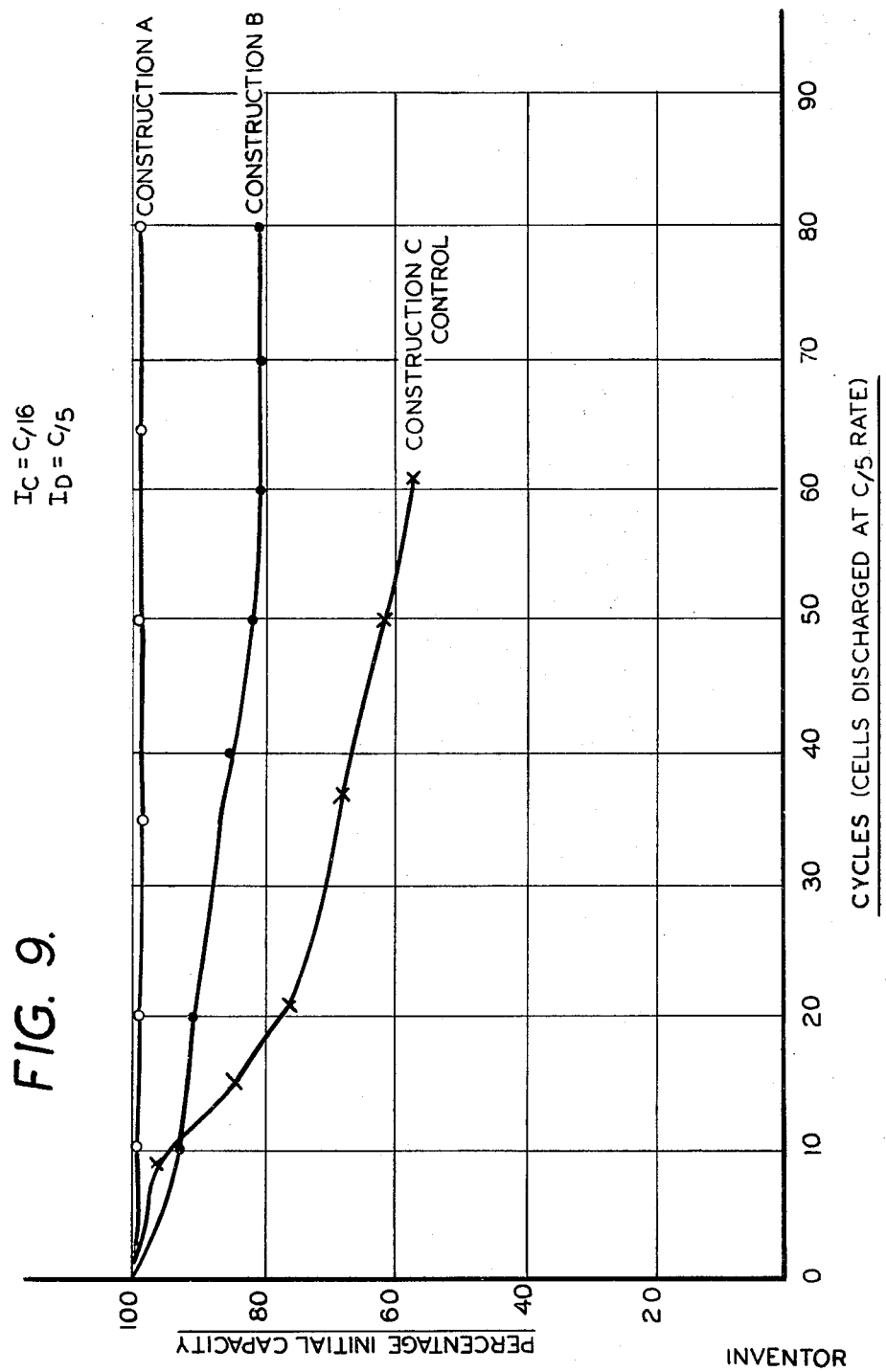

3,505,115
ALKALINE BATTERY
James McBreen, Bronx, N.Y., assignor to Yardney International Corp., New York, N.Y., a corporation of New York
Filed May 11, 1967, Ser. No. 637,722
Int. Cl. H01m 43/02, 43/06, 35/02
U.S. Cl. 136—30                                6 Claims

ABSTRACT OF THE DISCLOSURE

An alkaline battery cell of the silver-zinc type has a negative electrode whose active material, in a charged state, is essentially zinc over an area confronting the active material of a juxtaposed positive (silver) electrode, a marginal zone of the negative electrode not confronting any positive active material consisting of zinc oxide even in the charged state; ancillary negative electrodes of zinc oxide may flank the two confronting electrodes in abutting relationship with the projecting side edges of the main negative electrode.

---

Electrochemical batteries and employing an alkaline electrolyte have been known for many years. Batteries of this type have been constructed to operate as secondary, or so-called rechargeable, cells in that they are capable of internal chemical reaction to produce electricity which can be utilized in the known manner and in that they are further capable of being recharged by feeding electricity thereto whereby the components of the cell are reconstituted into a condition such that they are again capable of chemical interaction to produce usable electricity.

One particular example of such a rechargeable galvanic cell utilizes, in the discharged state, silver as the positive electrode material, zinc oxide as the negative electrode material, and potassium hydroxide as the electrolyte. This same illustrative system, in the charged state, has its positive electrode in the silver-oxide state and its negative electrode in the zinc state.

Galvanic systems of the type described have, in the past, usually been constructed with their electrodes of equal size on the theory that to make one of the electrodes of a different size would result in additional unnecessary expense since the additional material provided in the larger electrode is not available for utilization in galvanic action and is therefore wasted excess.

Although alkaline rechargeable galvanic cells have been made and utilized for some time in existing constructions and have been found more than adequate in service, it has been noted that such cells show a loss of capacity when subjected to repetitive cycling. In connection with such loss of capacity, there has been noted a distinct change in the shape of the negative electrode during such cyclic discharge-recharge use.

It appears that electrode-shape change is produced by zinc oxide dissolving, from many edge points or imperfections in the electrode surface, into the electrolyte and redepositing on a more active portion of the electrode.

It is therefore an object of this invention to provide a novel alkaline secondary galvanic cell which is superior to those available in the prior art.

Another object of this invention is to provide such a novel cell construction which eliminates or at least substantially reduces the above-noted loss in cell capacity over extended cyclic utilization.

A further object of this invention is to provide a novel cell construction which acts in such a manner as to avoid the change in shape of the negative electrode during cyclic charge-discharge utilization of such cell.

Other and additional objects of this invention will become apparent as the description proceeds.

In accordance with and fulfilling these objects, one aspect of this invention resides in a secondary-galvanic cell construction comprising a positive electrode, a negative electrode containing an active material adapted to be oxidized by interaction with said positive electrode in said electrolyte, an alkaline electrolyte, and a wettable separator material interspersed between said electrodes and substantially saturated with said electrolyte, wherein said positive electrode and said negative electrode face each other over at least a portion of the surfaces thereof and wherein the facing active portions of said electrodes are so dimensioned that the active portion of the negative electrode overhangs that of the positive electrode. In a preferred embodiment of this invention an oxidized form of the negative active, material which is soluble in the electrolyte is provided in the cell outside the space across which the active portions of the electrodes face each other.

In an embodiment of this invention intended for commercialization, the negative active material in the charged state is zinc, the positive active material in the charged state is silver oxide, and the electrolyte is potassium hydroxide. The electrodes are advantageously plate electrodes or may be convoluted in a configuration with surfaces thereof substantially parallel to each other. It has been found expedient to make the positive and negative electrodes only partly of active electrode material.

The positive electrode may have its active material retained within a substantially inert frame. The positive-electrode frame may be constructed of a polymeric material such as for example a fluorinated polyolefin, e.g. polytetrafluoro ethylene or polytrifluorochloro ethylene, an acrylic, e.g. polymethylmethacrylate, acrylonitrile copolymers, a vinyl resin, e.g. polyvinyl chloride or polyvinyl idene chloride, a diene-type resin, e.g. polybutadiene, butadiene-styrene copolymers, terpolymers and mixtures of copolymers of acrylonitrile, butadiene and styrene, etc. The negative electrode may have a grid construction impregnated with active electrode material. Suitable lead wires or other electrical connections are usually provided from each electrode to an appropriate terminal. Where a battery of a multiplicity of cells is constructed, like electrodes are electrically interconnected and are connected to a common terminal.

It has been found advantageous to arrange the separator as a U-fold, open at the top, about at least one electrode and to make the level of electrolyte lower than this open top. The separator material may be woven or nonwoven fabric or a membrane of composition which is substantially inert to the electrolyte during all stages of the cell's charge-discharge cycle. Separator material may be nylon, polyester, acrylic, polyolefin, regenerated cellulose, polyvinyl alcohol or other, similar alkali-resistant materials. The physical structure of the separator is substantially immaterial as long as its material is sufficiently porous to be electrolyte-permeable.

Galvanic systems which, apart from the silver-oxide/zinc couple described above are adpated to be used in conjunction with my improved cell structure include nickel/zinc, air/zinc or managanese dioxide/zinc couples and, in fact, can comprise zinc in combination with any material which is more electro-positive than zinc on the EMF scale.

In the structure defined herein, the active area of the negative electrode is greater than the active area of the positive electrode which it faces. This physical construction can best be realized by providing a negative electrode which overhangs the positive electrode in at least one dimension. It is more advantageous to let the active area of the negative electrode project beyond the active area of the positive electrode along two or more edges, preferably at the top and sides. Where an inert frame is provided for the positive electrode, it may be convenient to make the negative electrode of the same or similar outside dimensions as the outside dimensions of the inert frame. Where practical, it is most desirable to provide the negative-electrode active area with at least about ⅛ inch of active on any overhanging portion which does not confront the active positive area. There does not appear to be a theoretical upper limit to the extent of the overhang, yet non-registering margins up to about ½ in. width would appear to be sufficient from a practical point of view.

Understanding of this invention will be facilitated by reference to the accompanying drawing in which:

FIG. 1 is a front elevation of the positive electrode of a battery according to one embodiment of the invention;

FIG. 2 is a front elevation of the negative electrode of a battery according to the invention;

FIG. 3 is a side elevation partly in section of a full assembly of a battery according to the invention including a positive and a negative electrode as illustrated in FIGS. 1 and 2;

FIGS. 4, 5 and 6 illustrate, as part of another embodiment of the invention, a negative electrode in front elevation (FIG. 4), a positive electrode in front elevation (FIG. 5), and a schematic front view of the assembly of the electrodes in a battery (FIG. 6);

Figure 7:
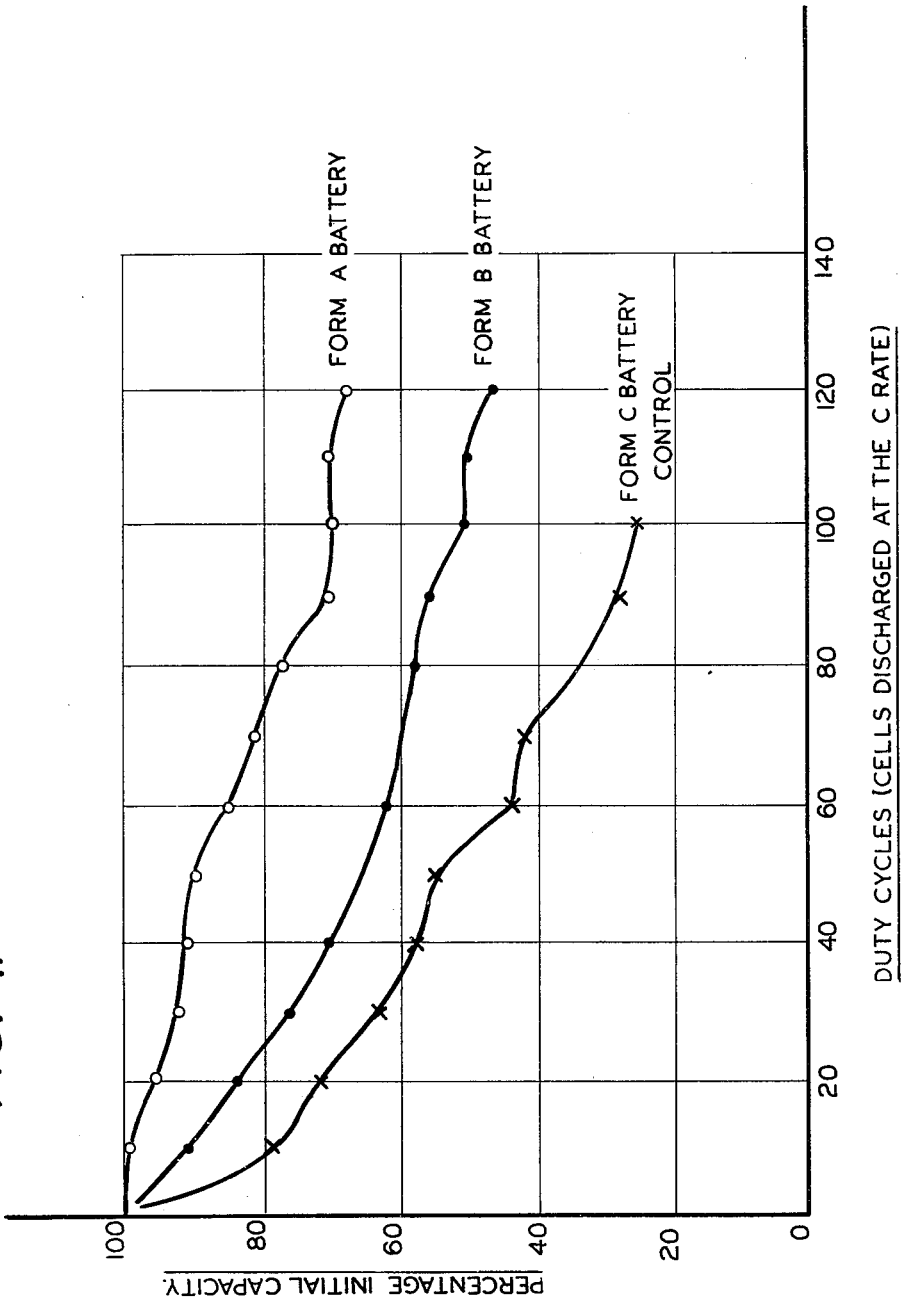

FIGS. 7, 8 and 9 are a series of curves showing performance characteristics of the embodiments corresponding to FIGS. 1, 2 and 3 (battery A) and FIGS. 4, 5 and 6 (battery B) as compared to a conventional battery.

FIGS 1, 2 and 3 illustrate an embodiment of the invention wherein an improved reduction in zinc shape change takes place without the need for precise alignment of the positive and negative plates.

FIG. 1 illustrates a positive electrode member 10 comprising a charged plate of sintered silver powder (as silver oxide) 16 and a margin of inert material 18, for instance, an epoxy resin, of the same thickness as the silver plate 16. An associated negative electrode 12 (FIG. 2) consists of metallic zinc or zinc compound in powder form pressed onto a grid and has overall dimensions greater than the positive electrode. The marginal periphery 12B of the negative electrode 12 is formed from zinc oxide and corresponds at least to a area of the frame 18 of the positive electrode 10, thus having substantially the same outline as that frame. The active area of electrode 12, coextensive with the exposed area 16 of electrode 16, has been designated 12A.

The frame 18 is constructed of an inert material not subject to attack by the electrolyte or the components of either electrode, specifically of a non-conductive plastic such as Teflon, polystyrene or an ABS resin. The electrodes are assembled into a casing or housing 14 (FIG. 3). The positive electrodes 10 are contained within electrolyte-permeable separators 20 preferably arranged as U-folds. The separators thereby define compartments for receiving an electrode 10 in each fold, the arrangement essentially enclosing the electrode at the bottom and extending above the top, thus preventing any foreign solid material from getting into the compartments. Each of the positive electrodes 10 is suitably connected to a conductive lead 22 for conducting current to a common terminal (not shown). Similarly, each negative electrode 12 is provided with a conductive lead 24.

The cell housing 14 is filled with an alkaline electrolyte, preferably of potassium hydroxide, to a level above the top of the electrodes but not higher than the open ends of the separators. The battery housing is preferably provided with a top or closure (not shown) which advantageously includes a pressure-relief valve of the type conventionally used in the battery art.

The separator 20 is made of a wettable and preferably swellable material such as regenerated cellulose or polyvinyl alcohol. The electrode assembly comprising the positive and negative electrodes and separator material is arranged within the space defined by the inner walls of the housing 14.

In operation the battery is charged to a state in which the silver of the positive electrode 10 has been substantially entirely converted to silver oxide whereas the active area 12A of the negative plate consists substantially entirely of zinc. The zinc oxide constituting the periphery of the negative electrode, occupying the area 12B which is not directly opposite the exposed or active positive area 16, remains substantially unchanged (i.e. unreduced) throughout the cycling of the electro battery including both charging and discharging phases. Because of the presence of zinc oxide on the periphery of the negative electrode no shape changes take place along the outer edge of the margin 12B. Heretofore, it had been appreciated by those skilled in the art that shape changes of the negative electrode caused a gradual reduction in the size of the peripheral portion of the electrode with consequent transfer of negative electrode material from the periphery to the central and lower portions if not a loss of the negative electrode material by flaking or deposition on the bottom of the battery.

Although a complete understanding of the true nature of the action brought about by the invention is not known or fully understood, it appears that several explanations may help in the appreciation of the principles of the invention. As is well known, the electrochemical reaction causes the conversion of zinc oxide to zinc in the charging process. This involves the formation of zinc oxide in a soluble form in the electrolyte as zincate. It appears that the soluble zinc oxide, i.e. zincate, in the electrolyte is preferentially deposited onto the active region of the electrode only so long as there is a sufficient concentration of zincate in the electrolyte. If for any reason, such as the end of charge or overcharge, the zinc solution becomes non-homogeneous or is otherwise depleted in zincate, the deposition of zinc on the electrode will be reduced at certain sites, usually the edge portions of the electrode. In order to maintain zincate equilibrium in the electrolyte over the total plate area, the zinc will dissolve from the depleted sites of the electrode. This results in dissolution or destruction of the edge portion of the negative electrode, the zinc or zinc oxide being detached from those portions. As a consequence, the gradual reduction in the plate area of the zinc electrode seriously affects the capacity and cycling capability of the cell. In accordance with the invention, the extension of the negative electrode beyond the region wherein the usual electrochemical reaction takes place provides a reservoir or zinc-oxide ions that may be needed to maintain homogeneous uniform solution of such ions over the total active plate area.

The frame 18 of inert material arranged about the positive electrode 16 serves the purpose of keeping the zinc-oxide margin 12B under pressure. The true nature of the result of pressurized zinc oxide is not understood but it appears to contribute to the improved operation of the cell.

The extension of the negative electrode with the positive electrode may range from 1/16 inch to ½ inch and is preferably ⅛ inch. This extension as noted above may be actual increased dimensions or may be the result of the masking or framing of the positive electrode.

FIG. 5 illustrates an embodiment wherein the negative electrode is of increased actual size as compared to the positive electrode. The electrode assembly composed of negative electrode 120, positive electrode 100 and a separator (not shown) is positioned in a casing 114 shown in FIG. 6 wherein the bottom edges of the electrodes are in alignment and the electrode 100 is centrally positioned with respect to the negative electrode 120 as is shown by the dotted lines which correspond to the periphery of the positive electrode. Conductor leads 240 and 220 extend from the electrodes 120 and 100 respectively to the terminals of the battery (not shown).

Plates of zinc oxide 118 and 119 are positioned laterally in the housing in such a fashion that their major faces are directly opposite the vertical side edges of both electrodes and in abutting contact with the vertical edges of the negative electrode. If necessary, means not shown but capable of maintaining such abutting contact between these ancillary electrodes 118, 119 and the main negative electrode can be provided.

While this embodiment of the invention has been illustrated with a simple electrode assembly, it is of course possible to employ this arrangement with a plurality of like electrode assemblies.

Furthermore while in connection with the preceding figures preformed zinc-oxide plates have been described, it has been found that equally satisfactory results are obtained by packing the lateral edges of the electrode assemblies with a zinc-oxide slurry.

Any means whereby extra zinc oxide is made available at the edges of the negative electrode outside of the active positive area is within the spirit and scope of the instant invention.

In FIGS. 7, 8 and 9, the results of a series of experiments each carried out with a cell constructed of the type shown in FIGS. 1, 2 and 3 (battery B) and a cell of conventional construction (battery C) under comparative conditions are graphically illustrated.

Battery B differed from Battery C only in that the edges of the negative extended beyond those of the positive plate and in that it was provided with laterally arranged zinc oxide plates. Battery A differed from Battery C in that a portion of the silver positive electrode was masked by a frame arrangement as shown and described above.

The experiment shown in FIG. 9 is at the time of preparation of the application still being carried out. 120 cycles have been registered and constructions A and B are still active with substantially no loss in capacity.

It has further been discovered that still better capacity maintenance can be obtained with cells structured as set forth hereinabove if there is provided in the negative electrode a fluorinated olefin polymeric binder consisting, for instance, of polytetrafluoroethylene.

What is claimed is:

1. A rechargeable galvanic cell comprising a first electrode with an exposed area of relatively electropositive electrode material substantially entirely in oxidized form in a charged state of the cell, a second electrode with an active area of relatively electronegative zinc electrode material coextensive with said exposed area, said electronegative zinc material being essentially in elemental metallic form in said charged state, said second electrode further having a marginal area in non-registering relationship with said exposed area, said marginal area containing solely said electronegative material in oxidized form in the charged state, said electrodes being substantially rectangular plates with lower, upper and side edges, said second electrode projecting beyond said first electrode at least along said side edges, and an alkaline electrolyte in contact with said electrodes, said electrolyte containing a concentration of ions of an oxide of said electronegative zinc material.

2. A cell as defined in claim 1 wherein said second electrode projects beyond said first electrode also along its upper edge.

3. A cell as defined in claim 1, further comprising a pair of ancillary electrodes with major faces abutting the side edges of said second electrode and spacedly confronting the side edges of said first electrode, said ancillary electrodes consisting essentially of said electronegative material in oxidized form.

4. A cell as defined in claim 1 wherein said first electrode is provided with a frame of inert material surrounding said exposed area, the outline of said frame being substantially coextensive with that of said marginal area of said second electrode.

5. A cell as defined in claim 1, further comprising an electrolyte-permeable separator interposed between said exposed area of said first electrode and said active area of said second electrode.

6. A cell as defined in claim 1 wherein said electropositive material is silver.

References Cited

UNITED STATES PATENTS

| | | | |
|---|---|---|---|
| 2,487,499 | 11/1949 | Webb | 136—13 |
| 2,738,375 | 3/1956 | Schlotter | 136—30 |
| 2,987,567 | 6/1961 | Freas et al. | 136—30 |
| 3,050,576 | 8/1962 | Comanor | 136—30 |
| 3,068,311 | 12/1962 | Chambers et al. | |
| 3,098,772 | 7/1963 | Taschek. | |
| 3,226,260 | 12/1965 | Drengler | 136—30 |
| 3,261,715 | 7/1966 | Solomon et al. | 136—31 |
| 3,272,653 | 9/1966 | Solomon et al. | 136—30 |
| 3,096,215 | 7/1963 | Voss et al. | 136—6 |
| 3,395,043 | 7/1968 | Shoeld | 136—6 |

W. A. SLOUGH, Primary Examiner

CHARLES F. LE FEVOUR, Assistant Examiner

U.S. Cl. X.R.

136—20